United States Patent [19]
Klein et al.

[11] Patent Number: 5,370,404
[45] Date of Patent: Dec. 6, 1994

[54] RADIAL LIP SEAL WITH INTERPOSED BEARING

[75] Inventors: Norbert Klein; Gerhard Freiwald, both of Hemsbach, Germany

[73] Assignee: Firma Carl Freudenberg, Weinheim, Germany

[21] Appl. No.: 32,897

[22] Filed: Mar. 18, 1993

[30] Foreign Application Priority Data

Mar. 27, 1992 [DE] Germany .................. 4209953

[51] Int. Cl.<sup>5</sup> ............................. F16J 15/32
[52] U.S. Cl. ......................... 277/37; 277/152; 277/153; 384/484
[58] Field of Search .............. 277/35, 37, 152, 153; 384/484, 486

[56] References Cited

U.S. PATENT DOCUMENTS

| | | | |
|---|---|---|---|
| 3,306,683 | 2/1967 | Duering | 277/153 X |
| 4,566,812 | 1/1986 | Takei et al. | 384/484 |
| 4,611,931 | 9/1986 | Brandenstein et al. | 384/484 X |
| 4,848,776 | 7/1989 | Winckler | 277/153 X |
| 4,872,770 | 10/1989 | Dickinson | 277/152 X |
| 5,167,419 | 12/1992 | Robertson | 277/153 X |

FOREIGN PATENT DOCUMENTS

| | | | |
|---|---|---|---|
| 3304397 | 8/1984 | Germany | 384/484 |
| 3744442 | 7/1989 | Germany | 277/152 |
| 4209320 | 10/1992 | Germany | 277/152 |
| 996365 | 6/1965 | United Kingdom | 384/484 |
| 2123096 | 1/1984 | United Kingdom | 384/484 |

*Primary Examiner*—William A. Cuchlinski, Jr.
*Assistant Examiner*—Scott W. Cummings
*Attorney, Agent, or Firm*—Kenyon & Kenyon

[57] ABSTRACT

A sealing arrangement for sealing a shaft passing through a bore in a wall is disclosed. The sealing arrangement comprises a radial shaft sealing ring which surrounds the shaft with radial pre-tension, forming a seal on the circumference of the shaft via at least one sealing lip made of an elastomeric material. The sealing lip is affixed on a first shank of an essentially L-shaped first reinforcement ring which faces radially inward. A second shank extends in an axial direction, is mantled by elastomeric material at least in the portion which extends axially, and touches the wall with radial pre-tension, forming a seal. In the radial direction, between the shaft and the second shank, is arranged a rolling bearing, which contacts the shaft via its inner ring and contacts the mantled partial region of the second shank via its outside ring.

9 Claims, 2 Drawing Sheets

5,370,404

RADIAL LIP SEAL WITH INTERPOSED BEARING

BACKGROUND OF THE INVENTION

1. Field of the Invention

The present invention relates to a sealing arrangement for sealing a rotating shaft passing through a bore in a wall. This sealing arrangement includes a radial shaft sealing ring, which surrounds the shaft and exhibits radial pre-tension, thereby forming a seal on the circumference of the shaft. The sealing ring has at least one sealing lip made of an elastomeric material, and the sealing lip is affixed on a first shank of an L-shaped first reinforcement ring which faces radially inward. A second shank extends in an axial direction, is mantled by an elastomeric material in the area of its axial end, and touches the wall with radial pre-tension to form a seal.

2. Description of the Related Art

Sealing arrangements are generally known and have been used to seal components which rotate relative to one another. In these prior art devices, the radial shaft sealing ring is arranged in a housing so as not to rotate and rests against a rotating shaft with a sealing lip projecting radially inwardly. The usage properties of such a seal can be unsatisfactory, depending on the conditions of the particular application. Motor vehicles using the above-described prior art sealing arrangement can have serious disadvantages, since the shafts to be sealed—for example the power take-off shafts of a motor vehicle transmission—may not demonstrate optimum concentricity when excited to produce vibrations. These vibrations can be dependent on the load status of the internal combustion engine connected with the shaft.

SUMMARY OF THE INVENTION

The present invention is based on the need to develop a sealing arrangement with significantly improved usage properties resulting in a long useful lifetime, and which insulates and damps vibrations of the rotating shaft which occur during use.

To improve the usage properties of the sealing arrangement of the present invention over a long useful lifetime, to better guide the shaft to be sealed, and to provide effective vibration insulation and damping of the shaft, a rolling bearing is arranged between the shaft and the second shank. The inner ring or race of the rolling bearing rests on the shaft and the outer ring or race of the rolling bearing rests on the mantled partial region of the second shank. By integrating the rolling bearing—which can be formed of a deep groove ball bearing, for example—into the seal unit, guidance of the shaft is significantly improved. This improved guidance guarantees improved sealing over a long useful lifetime. The arrangement of the rolling bearing according to the present invention, within the radial shaft sealing ring, also reduces noise from acoustically disruptive vibrations resulting from imbalance of the shaft. The result is prevention of propagation of undesirable noises.

According to an advantageous embodiment, the mantling on the side facing the outside ring has a radial thickness of 0.2 to 0.9 mm. With this structure, sufficient resilience in case of radial displacement of the shaft is guaranteed, while good guidance of the shaft and the rolling bearing surrounding the shaft is also guaranteed.

In order to allow simplified assembly, the mantling on the side facing the rolling bearing can have an open, groove-shaped recess, so that the outside ring can be snapped into the recess. This groove preferably has an axial expanse which slightly exceeds the axial expanse of the outer ring of the roller bearing, so that locking of the outside ring in the groove can easily take place, and slight play in the axial direction is present. The groove-shaped recess furthermore has the advantage that the rolling bearing is fixed in place relative to the shaft and the housing. Migration of the rolling bearing in an axial direction relative to the sealing ring can be reliably avoided in this manner.

The mantling on the side facing the wall can have at least two circumferential sealing ribs, which are adjacent to each other with an axial distance between them. These sealing ribs work as a static seal. Several sealing ribs can be arranged adjacent each other in an axial direction, depending on the pressures to be sealed and the viscosity of the medium to be sealed, in order to form a labyrinthine path. A good static seal is guaranteed in this way.

The shaft can be surrounded by an auxiliary sealing lip, forming a seal, which is arranged adjacent to the sealing lip on the side facing away from the medium to be sealed. The auxiliary sealing lip, the sealing lip and the shaft therefore define a cavity. To improve the usage properties of the seal during a long useful lifetime, this cavity can be filled with grease during use, in accordance with the particular environment. The auxiliary sealing lip, which acts as a preliminary seal, in combination with the grease-filled cavity, thereby keep contaminants, which reduce the usage lifetime, away from the sealing lip. The sealing arrangement according to the present invention can operate under extremely difficult usage conditions.

A significant improvement in the fixation of the seal arrangement within the wall of a housing can be achieved if the second shank is completely surrounded by the mantling and the mantling is surrounded on the outside, along an axial partial region on the side facing the wall, by a second reinforcement ring made of metallic material. The mantling projects above the partial region in a radial direction during use. This arrangement is advantageous because axial displacements of the total seal arrangement relative to the wall of a housing can be prevented, even if the shaft is deflected in a radial direction during rotation, or undergoes temperature expansion.

The second reinforcement ring, which can be connected to the mantling in an adhesive manner, is pressed into the bore of the wall and held in this bore by friction. For a good seal against the housing, the mantling of the first reinforcement ring projects beyond the second reinforcement ring in the radial direction, and thus can be brought into engagement with the wall to be sealed with elastic pre-tension. In this structure, there is good guidance of the shaft, because of the support of the rolling bearing, while at the same time the vibrations which occur are insulated or damped. Furthermore, good spatial orientation of the sealing arrangement between the wall and the shaft is made possible, while still maintaining a long useful lifetime. A transfer of vibration noises to the surroundings is clearly reduced in this arrangement.

The second reinforcement ring and the mantling can be adhesively connected. For example, the two components can be vulcanized together or can be connected to each other by an adhesive. Such a fixation of both parts to each other is extremely reliable and can be maintained even over a long period of use.

In terms of production and assembly, it is advantageous if the second reinforcement ring has an L-shaped profile and can be placed against a radial surface of the wall with a flange projecting in the radial direction. If the second reinforcement ring is vulcanized onto the mantling, simplified production is achieved. Assembly and precise positioning of the sealing arrangement in the gap between the housing and the shaft is simplified by the flange which projects in the radial direction. The sealing arrangement can be pushed into the gap between the housing and the shaft in an axial direction until the flange rests against the wall of the housing.

As a function of the conditions of the application case, the portion of the flange which projects radially outward can be surrounded by an elastomeric material, which can form a component of the mantling and has a sealing lip projecting in the axial direction on the side facing the wall. Leakage between the seal arrangement and the housing surrounding the seal arrangement is prevented with this structure. The sealing ribs of the mantling, which project in the radial direction, and/or the axial sealing lip, reliably retain the fluid to be sealed.

Pursuant to another advantageous embodiment, the second shank may have a cropped profile. Furthermore, the partial region of the second shank, can be relatively widened in its diameter, can at least partially surround the outside ring, with radial interposition of the mantling, and can be arranged within the second reinforcement ring, also with radial interposition of the mantling. It is advantageous if the seal arrangement has particularly small dimensions in the radial direction. In addition to the small dimensions in the radial direction, approximately uniform wall thicknesses of the mantling around the first reinforcement ring are guaranteed, so that undesirable material accumulations are avoided. The partial region which is relatively widened in its diameter is utilized for better support of the outside ring of the rolling bearing in the axial direction, so that precise positioning of the rolling bearing within the seal arrangement is achieved. Within the scope of the present invention, it is provided that the two reinforcement rings are arranged concentrically.

Particularly good usage properties with regard to vibration insulation and damping and minimization of noise transfer can be achieved if the mantling between the two reinforcement rings has a layer thickness of 0.7 to 3.0 mm, preferably 0.8 mm to 1.5 mm.

DESCRIPTION OF THE PREFERRED EMBODIMENTS

Figure 1:
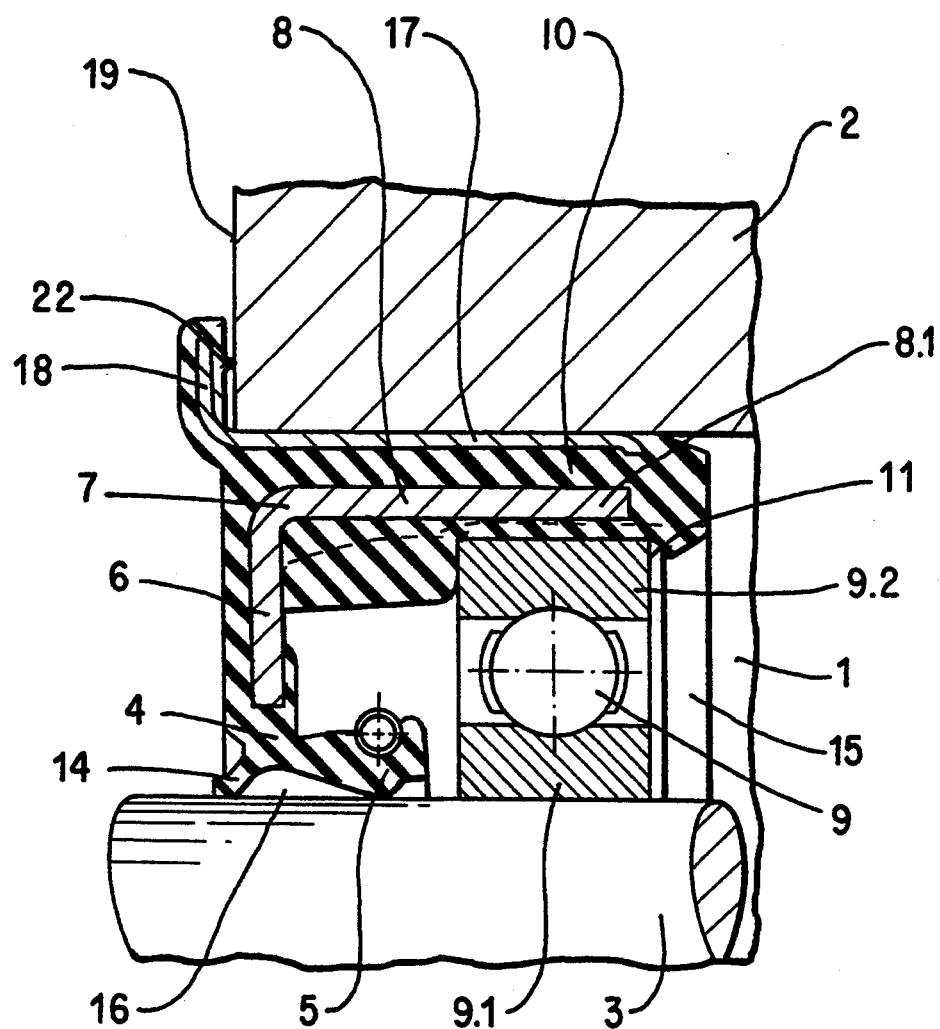
FIG. 1 shows a cross-sectional view of a first embodiment of the present invention, with a second shank that runs in a straight line in the axial direction and a flange which is mantled with an elastomeric material in the region of its radial delimitation, where the elastomeric material is made in one piece with the mantling.
Figure 2:
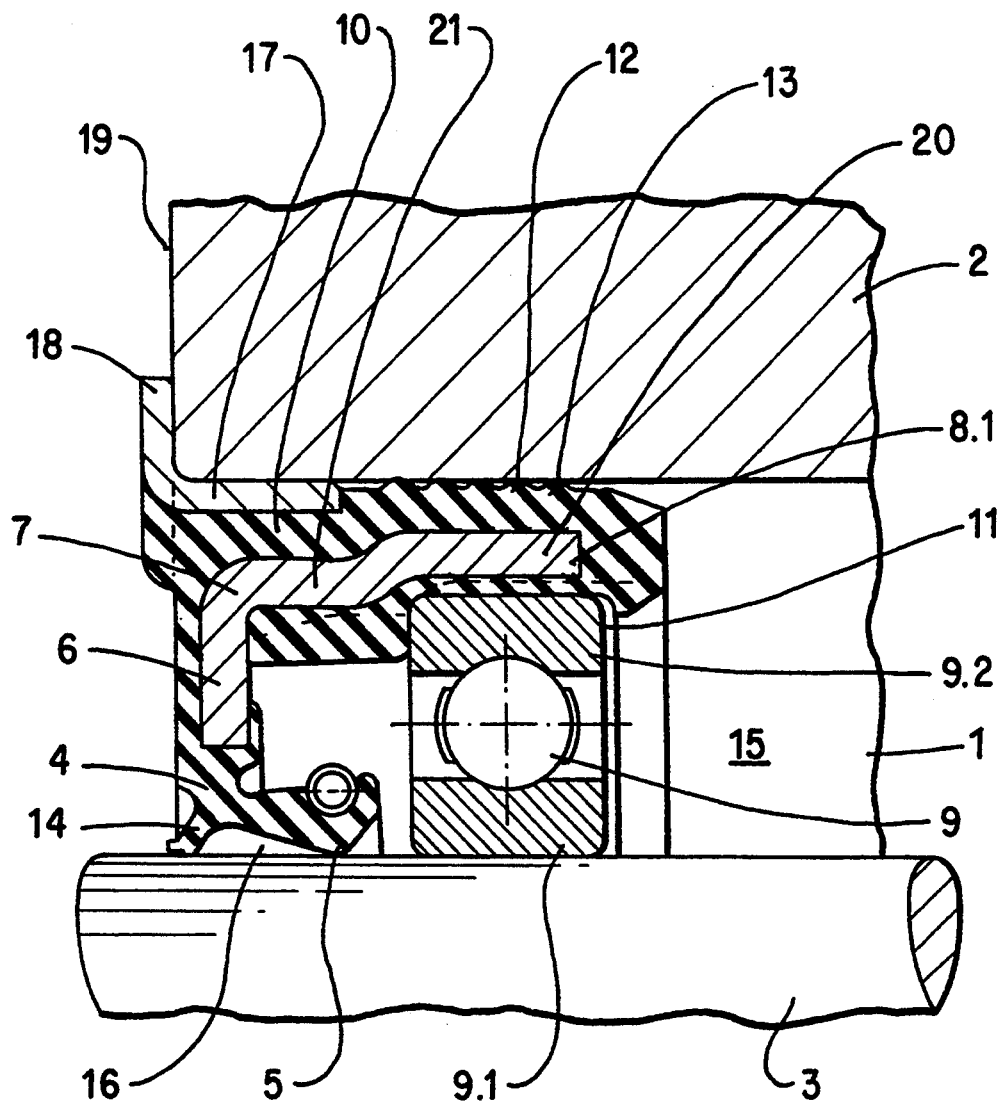
FIG. 2 shows a cross-sectional view of a second embodiment of the present invention, similar to the seal arrangement in FIG. 2, where the second shank is structured in a cropped manner, and the second reinforcement ring has no mantling in the region of its radial end.

FIGS. 1 and 2 each show an embodiment of a seal arrangement for sealing a shaft 3 passing through a bore 1 in a wall 2. The seal arrangement consists of a radial shaft sealing ring 4 and an integrated rolling bearing 9. The radial shaft sealing ring 4 seals against the shaft 3—which rotates relative to the wall 2—dynamically, while it seals against the wall 2 statically. In the embodiments shown in the drawings, the dynamic seal of the shaft 3 is achieved by a sealing lip 5 and an auxiliary sealing lip 14, which touch the shaft 3 on its circumference. The auxiliary sealing lip 14 is arranged adjacent to the sealing lip 5, at an axial distance from it, and thereby delimits a cavity 16, in cooperation with the shaft 3. The cavity 16 can be filled with grease in order to protect the sealing lip 5. In both embodiments, the first reinforcement ring 7 has a second shank 8 which extends in the axial direction, and which is completely surrounded by the mantling 10. The rolling bearing 9 is held in place on the inner circumference by shaft 3 cooperating with its inner ring or race 9.1, and on its outer circumference in a groove-shaped recess 11 of the mantling 10 with its outside ring or race 9.2. The seal arrangements according to the present invention achieve good support of the rotating shaft with simultaneous vibration insulation and damping. The seal arrangement of the present invention also reduces noise formation, and reliable spatial orientation of the seal arrangement in the gap between the wall 2 and the shaft 3 is assured.

In FIG. 1, the second shank 8 of the first reinforcement ring 7 is structured in a straight line in the axial direction, and the second reinforcement ring 17 has an expanse in the axial direction which runs parallel with this straight-line portion. The mantling 10 in the region of the axial end 8.1 of the second shank 8 projects slightly beyond the second reinforcement ring 17 in the radial direction as a result of its production, so that a reliable seal of the medium 15 to be sealed is guaranteed during use. In addition, the flange 18 of the second reinforcement ring 17, which projects outward in the radial direction, is mantled with an elastomeric material, which is formed in one piece with the mantling 10 of the second shank 8. Reliable fixation of the seal arrangement within the bore 1 is guaranteed by a friction bond between the outside circumferential surface of the second reinforcement ring 17 and the inside circumferential surface of the wall 2. Additional reliability with regard to sealing of the housing is guaranteed by the axial sealing lip 22, which seals the flange 18 relative to the radial surface 19.

In FIG. 2, the second shank 8 has a cropped profile, where the partial region 20 of the second shank 8, which is relatively widened in its diameter, surrounds the outside ring 9.2 of the rolling bearing 9, with radial interposition of the mantling 10. The partial region 21 of the second shank 8, which is relatively reduced in its diameter, is arranged within the second reinforcement ring 17, with radial interposition of the mantling 10. In this embodiment, the layer thickness of the mantling 10 is shaped, so that undesirable material accumulations are avoided. This is of particular importance in terms of production of the parts of the sealing arrangement. In this embodiment, a friction bond is formed between the housing 2 and the second reinforcement ring 17. The second reinforcement ring 17 is structured to be shorter in the axial direction than the second reinforcement ring 17 in FIG. 1. In this embodiment, also, the mantling 10 projects outward beyond the second reinforcement ring 17 in the radial direction, so that a reliable seal of the medium 15 to be sealed is guaranteed. The embodiments in FIGS. 1 and 2 are similar in their method of functioning and in their good usage properties.

We claim:
1. A sealing arrangement for sealing a shaft passing through a bore in a wall comprising:
- a radial shaft sealing ring surrounding the shaft and sealed to the shaft with radial pre-tension, said shaft sealing ring thereby forming a seal on the circumference of said shaft, said shaft sealing ring comprising at least one resilient sealing lip sealing against said shaft;
- a first reinforcement ring, said sealing lip being affixed on a first shank of said first reinforcement ring, said first shank projecting radially inward, said first reinforcement ring further comprising a second shank projecting in an axial direction, said second shank being surrounded by a resilient mantling at an axial end, said mantling contacting said wall with radial pre-tension, thereby forming a seal; and
- a rolling bearing arranged between the shaft and the second shank, an inner ring of said rolling bearing contacting said shaft and an outer ring of said rolling bearing contacting said mantling; and
- a second reinforcement ring comprising a partial region surrounding said mantling, said partial region surrounding said mantling on the side of the mantling facing said wall.

2. The sealing arrangement of claim 1, wherein:
said second reinforcement ring is made of a metallic material.

3. The sealing arrangement of claim 1, wherein:
said mantling projects above the partial region in a radial direction.

4. The sealing arrangement of claim 1, wherein:
the second reinforcement ring and the mantling are adhesively connected.

5. The sealing arrangement of claim 1, wherein:
the second reinforcement ring is L-shaped and contacts a radial surface of said wall via a flange projecting in the radial direction.

6. The sealing arrangement of claim 5, wherein:
the flange is surrounded by resilient material, and has a sealing lip projecting in the axial direction on the side of the flange facing the wall.

7. The sealing arrangement of claim 1, wherein:
said second shank has a portion which is relatively widened in diameter, said widened portion at least partially surrounding the outside ring of said rolling bearing, said mantling being interposed between said widened portion and said outside ring of said rolling bearing, the portion of said second shank which is not widened being disposed within the partial region of said second reinforcement ring, said mantling being interposed between the portion of said second shank which is not widened and said partial region of said second reinforcement ring.

8. The sealing arrangement of claim 1, wherein:
said first and second reinforcement rings are arranged concentric to one another.

9. The sealing arrangement of claim 1, wherein:
said mantling is disposed between said first and second reinforcement rings and has thickness in the area between the first and second reinforcement rings of between 0.7 and 3.0 mm.

* * * * *